US011778607B2

(12) United States Patent
Bhatoolaul et al.

(10) Patent No.: US 11,778,607 B2
(45) Date of Patent: Oct. 3, 2023

(54) USING RELATIVE TRANSMISSION OCCASION DELAY INDEXING

(71) Applicant: NOKIA TECHNOLOGIES OY, Espoo (FI)

(72) Inventors: David Bhatoolaul, Swindon (GB); Rapeepat Ratasuk, Inverness, IL (US); Nitin Mangalvedhe, Hoffman Estates, IL (US)

(73) Assignee: NOKIA TECHNOLOGIES OY, Espoo (FI)

(*) Notice: Subject to any disclaimer, the term of this patent is extended or adjusted under 35 U.S.C. 154(b) by 51 days.

(21) Appl. No.: 17/220,746

(22) Filed: Apr. 1, 2021

(65) Prior Publication Data
US 2022/0322386 A1    Oct. 6, 2022

(51) Int. Cl.
*H04W 72/1268* (2023.01)
*H04L 1/1607* (2023.01)
*H04L 5/00* (2006.01)
*H04W 72/23* (2023.01)

(52) U.S. Cl.
CPC ....... *H04W 72/1268* (2013.01); *H04L 1/1678* (2013.01); *H04L 5/0055* (2013.01); *H04W 72/23* (2023.01)

(58) Field of Classification Search
CPC ............ H04W 72/1268; H04W 72/14; H04W 72/0413; H04W 72/0446; H04W 72/04; H04W 4/70; H04L 1/1678; H04L 5/0055; H04L 1/1812; H04L 1/1816; H04L 1/1819
See application file for complete search history.

(56) References Cited

U.S. PATENT DOCUMENTS

| 10,880,918 | B2* | 12/2020 | Lee | H04L 5/0053 |
| 11,528,697 | B2* | 12/2022 | Zhao | H04L 1/00 |
| 2015/0305010 | A1* | 10/2015 | Guan | H04J 3/16 370/280 |
| 2016/0056933 | A1* | 2/2016 | Aiba | H04L 5/0048 370/329 |
| 2016/0135170 | A1* | 5/2016 | Chen | H04L 1/1858 370/336 |
| 2016/0242169 | A1* | 8/2016 | Park | H04L 1/1861 |

(Continued)

FOREIGN PATENT DOCUMENTS

| WO | WO 2014/071304 A1 | 5/2014 |
| WO | WO 2014/111495 A1 | 7/2014 |

OTHER PUBLICATIONS

Huawei et al: "WID revision: Additional enhancements for NB-IoT and LTE-MTC," 3GPP RP-201306, 3GPP TSG RAN Meeting #88e, Electronic Meeting, Jun. 29-Jul. 3, 2020.

(Continued)

*Primary Examiner* — Dung B Huynh
(74) *Attorney, Agent, or Firm* — SQUIRE PATTON BOGGS (US) LLP (57) ABSTRACT

Systems, methods, apparatuses, and computer program products for using relative uplink transmission delay indexing are provided. For example, a user equipment (UE) and a network node may determine valid uplink transmission occasions for control information and the network node may communicate an indication of a position of a valid uplink transmission occasion to the UE relative to other valid uplink transmission occasions for the control information.

18 Claims, 5 Drawing Sheets

(56) References Cited

U.S. PATENT DOCUMENTS

| | | | | |
|---|---|---|---|---|
| 2017/0118747 | A1* | 4/2017 | Rico Alvarino | H04W 4/70 |
| 2017/0180086 | A1* | 6/2017 | Xiong | H04W 84/18 |
| 2018/0097606 | A1* | 4/2018 | Toledano | H04L 1/1861 |
| 2018/0098239 | A1* | 4/2018 | You | H04L 5/0044 |
| 2018/0103433 | A1* | 4/2018 | Li | H04W 52/42 |
| 2018/0124775 | A1* | 5/2018 | Seo | H04L 1/1671 |
| 2018/0167170 | A1* | 6/2018 | Kim | H04L 1/1812 |
| 2018/0167917 | A1* | 6/2018 | Suzuki | H04W 72/042 |
| 2018/0184434 | A1* | 6/2018 | Blankenship | H04L 1/1812 |
| 2018/0199313 | A1* | 7/2018 | Suzuki | H04W 72/042 |
| 2018/0205512 | A1* | 7/2018 | You | H04L 5/0048 |
| 2018/0220412 | A1* | 8/2018 | Zhang | H04W 72/0446 |
| 2018/0234953 | A1* | 8/2018 | Beale | H04W 72/23 |
| 2018/0249440 | A1* | 8/2018 | Zhang | H04W 4/70 |
| 2018/0249446 | A1* | 8/2018 | You | H04W 72/042 |
| 2018/0254860 | A1* | 9/2018 | Wong | H04L 1/1664 |
| 2018/0255542 | A1* | 9/2018 | Seo | H04L 1/1854 |
| 2018/0279268 | A1* | 9/2018 | You | H04W 74/0833 |
| 2018/0294927 | A1* | 10/2018 | Takeda | H04L 1/1861 |
| 2018/0309544 | A1* | 10/2018 | Hwang | H04W 72/12 |
| 2018/0324841 | A1* | 11/2018 | Horiuchi | H04W 72/04 |
| 2018/0367185 | A1* | 12/2018 | Yi | H04B 1/7143 |
| 2018/0375623 | A1* | 12/2018 | Suzuki | H04W 72/04 |
| 2018/0376492 | A1* | 12/2018 | Wong | H04L 1/0072 |
| 2019/0045552 | A1* | 2/2019 | Blankenship | H04L 1/08 |
| 2019/0182799 | A1* | 6/2019 | Lee | H04W 8/26 |
| 2019/0239286 | A1* | 8/2019 | Chang | H04W 72/0413 |
| 2019/0246433 | A1* | 8/2019 | Zhu | H04L 5/0053 |
| 2019/0320306 | A1* | 10/2019 | Urabayashi | H04L 5/001 |
| 2020/0022105 | A1* | 1/2020 | Fu | H04W 52/0229 |
| 2020/0037349 | A1* | 1/2020 | Gao | H04L 27/2602 |
| 2020/0059330 | A1* | 2/2020 | Wong | H04L 1/1822 |
| 2020/0128579 | A1* | 4/2020 | Talarico | H04L 5/0055 |
| 2020/0169955 | A1* | 5/2020 | Chang | H04W 72/005 |
| 2020/0221481 | A1* | 7/2020 | Park | H04W 4/80 |
| 2020/0305131 | A1* | 9/2020 | Chatterjee | H04W 72/23 |
| 2020/0351062 | A1* | 11/2020 | Yi | H04W 72/044 |
| 2020/0374846 | A1* | 11/2020 | Zhao | H04L 5/0087 |
| 2021/0006356 | A1* | 1/2021 | Khoshnevisan | H04L 1/1864 |
| 2021/0219329 | A1* | 7/2021 | Zhou | H04W 72/23 |
| 2021/0255458 | A1* | 8/2021 | Yoon | G06F 3/012 |
| 2021/0314093 | A1* | 10/2021 | Mu | H04W 72/12 |
| 2021/0336819 | A1* | 10/2021 | Kim | H04L 5/0087 |
| 2021/0400712 | A1* | 12/2021 | Sun | H04W 72/23 |
| 2022/0006573 | A1* | 1/2022 | Beale | H04L 1/1896 |
| 2022/0052801 | A1* | 2/2022 | Mu | H04L 5/1469 |
| 2022/0053531 | A1* | 2/2022 | Sengupta | H04L 5/0053 |
| 2022/0191911 | A1* | 6/2022 | Hwang | H04W 52/42 |
| 2022/0210802 | A1* | 6/2022 | Hwang | H04L 1/1861 |
| 2022/0225140 | A1* | 7/2022 | Seo | H04W 4/70 |
| 2022/0386283 | A1* | 12/2022 | Höglund | H04W 72/23 |
| 2022/0393800 | A1* | 12/2022 | Ratilainen | H04W 4/70 |

OTHER PUBLICATIONS

China Telecom: "New WID: Enhancement of Private Network Support for NG-RAN," 3GPP RP-201326, 3GPP TSG-RAN Meeting #88, Electronic Meeting, Jun. 29-Jul. 3, 2020.
Ericsson: "Feature Lead Summary: [102-e-LTE-Rel17_NB_IoT_eMTC-02]," 3GPP R1-20xxxxx, 3GPP TSG-RAN WG1 Meeting #102-e, e-Meeting, Aug. 17-28, 2020.
3GPP TS 36.212 V15.13.0 (Mar. 2021), Technical Specification, 3rd Generation Partnership Project; Technical Specification Group Radio Access Network; Evolved Universal Terrestrial Radio Access (E-UTRA); Multiplexing and channel coding (Release 15), Mar. 31, 2021.
3GPP TS 36.212 V16.5.0 (Mar. 2021), Technical Specification, 3rd Generation Partnership Project; Technical Specification Group Radio Access Network; Evolved Universal Terrestrial Radio Access (E-UTRA); Multiplexing and channel coding (Release 16), Mar. 31, 2021.
3GPP TS 36.213 V15.13.0 (Mar. 2021), Technical Specification, 3rd Generation Partnership Project; Technical Specification Group Radio Access Network; Evolved Universal Terrestrial Radio Access (E-UTRA); Physical layer procedures (Release 15), Mar. 31, 2021.
3GPP TS 36.213 V16.5.0 (Mar. 2021), Technical Specification, 3rd Generation Partnership Project; Technical Specification Group Radio Access Network; Evolved Universal Terrestrial Radio Access (E-UTRA); Physical layer procedures (Release 16), Mar. 31, 2021.
International Search Report and Written Opinion dated Jul. 8, 2022 corresponding to International Patent Application No. PCT/EP2022/056769.
Qualcomm Incorporated, "Support 14 HARQ processes and scheduling delay," 3GPP Draft; R1-2009113, 3GPP TSG RAN WG1 #103-e, e-Meeting, Oct. 26-Nov. 13, 2020, Oct. 23, 2020, XP051946839.
Moderator (Ericsson), "Feature Lead Summary [104-e-LTE-Rel17_NB_IoT eMTC-02] 3rd check point," 3GPP Draft R1-2101847, 3GPP TSG-RAN WG1 meeting #104-e, e-Meeting, Jan. 25-Feb. 5, 2021, Feb. 4, 2021, XP051976071.

* cited by examiner

USING RELATIVE TRANSMISSION OCCASION DELAY INDEXING

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to systems and/or methods for using relative transmission occasion delay indexing.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR may provide bitrates on the order of 10-20 Gbit/s or higher, and may support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

According to a first embodiment, an apparatus may include at least one processor and at least one memory including computer program code. The at least one memory and the computer program code may be configured to, with the at least one processor, cause the apparatus at least to determine one or more valid uplink transmission occasions for control information. The at least one memory and the computer program code may be configured to, with the at least one processor, cause the apparatus at least to transmit signaling including an indication of a position of a valid uplink transmission occasion for control information relative to a position of one or more other valid uplink transmission occasions for control information.

In a variant, the one or more valid uplink transmission occasions for control information may include one or more valid hybrid automatic repeat request acknowledgement physical uplink control channel transmission occasions. In a variant, the at least one memory and the computer program code may be configured to, with the at least one processor, further cause the apparatus at least to transmit signaling including an indication of the one or more valid hybrid automatic repeat request acknowledgement physical uplink control channel transmission occasions. In a variant, the at least one memory and the computer program code may be configured to, with the at least one processor, further cause the apparatus, when determining the one or more valid uplink transmission occasions for control information, at least to determine the one or more valid uplink transmission occasions based on one or more of: an invalid uplink bitmap, an invalid downlink bitmap, a designated starting subframe, a machine type communication physical downlink control channel to physical downlink shared channel delay, a hybrid automatic repeat request identifier, or one or more physical uplink control channel positioning rules. In a variant, the one or more physical uplink control channel positioning rules may include a rule that a first machine type communication physical downlink control channel occasion in a cycle starts at a particular subframe. In a variant, the one or more physical uplink control channel positioning rules may include a rule that, where there is no downlink invalid subframe, a next number of available valid downlink subframes are used to schedule a machine type communication physical downlink control channel transmission.

In a variant, the one or more physical uplink control channel positioning rules may include a rule that, for a first number of machine type communication physical downlink control channel occasions, there is a delay of a number of valid downlink subframes before transmission of a corresponding physical downlink shared channel In a variant, the one or more physical uplink control channel positioning rules may include a rule that a predefined delay may be used for a last number of machine type communication physical downlink control channel occasions in a sequence of occasions. In a variant, the one or more physical uplink control channel positioning rules may include a rule that, after a number of machine type communication physical downlink control channel transmissions, a number of subframes are used to allow switching between downlink and uplink. In a variant, the at least one memory and the computer program code may be configured to, with the at least one processor, further cause the apparatus, when determining the one or more valid uplink transmission occasions for control information, at least to determine the one or more valid uplink transmission occasions based on a mapping of machine type communication physical downlink control channel occasions to physical downlink shared channel occasions and corresponding physical uplink control channel occasions.

According to a second embodiment, an apparatus may include at least one processor and at least one memory including computer program code. The at least one memory and the computer program code may be configured to, with the at least one processor, cause the apparatus at least to determine one or more valid uplink transmission occasions for control information. The at least one memory and the computer program code may be configured to, with the at least one processor, cause the apparatus at least to receive signaling comprising an indication of a position of a valid uplink transmission occasion for control information relative to a position of one or more other valid uplink transmission occasions for control information.

In a variant, the one or more valid uplink transmission occasions for control information may include one or more valid hybrid automatic repeat request acknowledgement physical uplink control channel transmission occasions. In a variant, the at least one memory and the computer program code may be configured to, with the at least one processor, further cause the apparatus at least to receive signaling comprising an indication of the one or more valid hybrid automatic repeat request acknowledgement physical uplink control channel transmission occasions. In a variant, the at least one memory and the computer program code may be configured to, with the at least one processor, further cause the apparatus, when determining the one or more valid uplink transmission occasions for control information, at least to determine the one or more valid uplink transmission occasions based on one or more of: an invalid uplink bitmap, an invalid downlink bitmap, a designated starting subframe, a machine type communication physical downlink control channel to physical downlink shared channel delay, a hybrid automatic repeat request identifier, or one or more physical uplink control channel positioning rules.

In a variant, the one or more physical uplink control channel positioning rules may include a rule that a first machine type communication physical downlink control channel occasion in a cycle starts at a particular subframe. In a variant, the one or more physical uplink control channel positioning rules may include a rule that, where there is no downlink invalid subframe, a next number of available valid downlink subframes are used to schedule a machine type communication physical downlink control channel transmission. In a variant, the one or more physical uplink control channel positioning rules may include a rule that, for a first number of machine type communication physical downlink control channel occasions, there is a delay of a number of valid downlink subframes before transmission of a corresponding physical downlink shared channel In a variant, the one or more physical uplink control channel positioning rules may include a rule that a predefined delay is used for a last number of machine type communication physical downlink control channel occasions in a sequence of occasions.

In a variant, the one or more physical uplink control channel positioning rules may include a rule that, after a number of machine type communication physical downlink control channel transmissions, a number of subframes are used to allow switching between downlink and uplink. In a variant, the at least one memory and the computer program code may be configured to, with the at least one processor, further cause the apparatus, when determining the one or more valid uplink transmission occasions for control information, at least to determine the one or more valid uplink transmission occasions based on a mapping of machine type communication physical downlink control channel occasions to physical downlink shared channel occasions and corresponding physical uplink control channel occasions. In a variant, the at least one memory and the computer program code may be configured to, with the at least one processor, further cause the apparatus at least to transmit the control information on the one or more valid uplink transmission occasions.

According to a third embodiment, a method may include determining one or more valid uplink transmission occasions for control information. The method may include transmitting signaling including an indication of a position of a valid uplink transmission occasion for control information relative to a position of one or more other valid uplink transmission occasions for control information.

In a variant, the one or more valid uplink transmission occasions for control information may include one or more valid hybrid automatic repeat request acknowledgement physical uplink control channel transmission occasions. In a variant, the method may include transmitting signaling including an indication of the one or more valid hybrid automatic repeat request acknowledgement physical uplink control channel transmission occasions. In a variant, determining the one or more valid uplink transmission occasions for control information may include determining the one or more valid uplink transmission occasions based on one or more of: an invalid uplink bitmap, an invalid downlink bitmap, a designated starting subframe, a machine type communication physical downlink control channel to physical downlink shared channel delay, a hybrid automatic repeat request identifier, or one or more physical uplink control channel positioning rules. In a variant, the one or more physical uplink control channel positioning rules may include a rule that a first machine type communication physical downlink control channel occasion in a cycle starts at a particular subframe. In a variant, the one or more physical uplink control channel positioning rules may include a rule that, where there is no downlink invalid subframe, a next number of available valid downlink subframes are used to schedule a machine type communication physical downlink control channel transmission.

In a variant, the one or more physical uplink control channel positioning rules may include a rule that, for a first number of machine type communication physical downlink control channel occasions, there is a delay of a number of valid downlink subframes before transmission of a corresponding physical downlink shared channel In a variant, the one or more physical uplink control channel positioning rules may include a rule that a predefined delay may be used for a last number of machine type communication physical downlink control channel occasions in a sequence of occasions. In a variant, the one or more physical uplink control channel positioning rules may include a rule that, after a number of machine type communication physical downlink control channel transmissions, a number of subframes are used to allow switching between downlink and uplink. In a variant, determining the one or more valid uplink transmission occasions for control information may include determining the one or more valid uplink transmission occasions based on a mapping of machine type communication physical downlink control channel occasions to physical downlink shared channel occasions and corresponding physical uplink control channel occasions.

According to a fourth embodiment, a method may include determining one or more valid uplink transmission occasions for control information. The method may include receiving signaling comprising an indication of a position of a valid uplink transmission occasion for control information relative to a position of one or more other valid uplink transmission occasions for control information.

In a variant, the one or more valid uplink transmission occasions for control information may include one or more valid hybrid automatic repeat request acknowledgement physical uplink control channel transmission occasions. In a variant, the method may include receiving signaling comprising an indication of the one or more valid hybrid automatic repeat request acknowledgement physical uplink control channel transmission occasions. In a variant, determining the one or more valid uplink transmission occasions for control information may include determining the one or more valid uplink transmission occasions based on one or more of: an invalid uplink bitmap, an invalid downlink bitmap, a designated starting subframe, a machine type communication physical downlink control channel to physical downlink shared channel delay, a hybrid automatic repeat request identifier, or one or more physical uplink control channel positioning rules.

In a variant, the one or more physical uplink control channel positioning rules may include a rule that a first machine type communication physical downlink control channel occasion in a cycle starts at a particular subframe. In a variant, the one or more physical uplink control channel positioning rules may include a rule that, where there is no downlink invalid subframe, a next number of available valid downlink subframes are used to schedule a machine type communication physical downlink control channel transmission. In a variant, the one or more physical uplink control channel positioning rules may include a rule that, for a first number of machine type communication physical downlink control channel occasions, there is a delay of a number of valid downlink subframes before transmission of a corresponding physical downlink shared channel In a variant, the one or more physical uplink control channel positioning rules may include a rule that a predefined delay is used for a last number of machine type communication physical downlink control channel occasions in a sequence of occasions.

In a variant, the one or more physical uplink control channel positioning rules may include a rule that, after a number of machine type communication physical downlink control channel transmissions, a number of subframes are used to allow switching between downlink and uplink. In a variant, determining the one or more valid uplink transmission occasions for control information may include determining the one or more valid uplink transmission occasions based on a mapping of machine type communication physical downlink control channel occasions to physical downlink shared channel occasions and corresponding physical uplink control channel occasions. In a variant, the method may include transmitting the control information on the one or more valid uplink transmission occasions.

A fifth embodiment may be directed to an apparatus that may include circuitry configured to cause the apparatus to perform the method according to the third embodiment or the fourth embodiment, or any of the variants of those embodiments discussed above.

A sixth embodiment may be directed to an apparatus that may include means for performing the method according to the third embodiment or the fourth embodiment, or any of the variants of those embodiments discussed above. Examples of the means may include one or more processors, memory, and/or computer program codes for causing the performance of the operation.

A seventh embodiment may be directed to a computer readable medium comprising program instructions stored thereon for causing an apparatus to perform at least the method according to the third embodiment or the fourth embodiment, or any of the variants of those embodiments discussed above.

An eighth embodiment may be directed to a computer program product encoding instructions for causing an apparatus to perform at least the method according to the third embodiment or the fourth embodiment, or any of the variants of those embodiments discussed above.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for using relative transmission delay indexing is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar wording, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar wording, throughout this specification do not necessarily all refer to the same group of embodiments, and the described features, structures, or characteristics may be combined in any suitable manner in one or more example embodiments. In addition, the phrase "set of" refers to a set that includes one or more of the referenced set members. As such, the phrases "set of," "one or more of," and "at least one of," or equivalent phrases, may be used interchangeably. Further, "or" is intended to mean "and/or," unless explicitly stated otherwise.

Additionally, if desired, the different functions or operations discussed below may be performed in a different order and/or concurrently with each other. Furthermore, if desired, one or more of the described functions or operations may be optional or may be combined. As such, the following description should be considered as merely illustrative of the principles and teachings of certain example embodiments, and not in limitation thereof.

Certain aspects of NR may relate to narrow band Internet of Things (NB-IoT) and LTE machine type communications (MTC). In this regard, NR may support a 14-HARQ process in downlink (DL) for LTE MTC. For example, NR may support additional physical downlink shared channel (PDSCH) scheduling delay for introduction of the 14-HARQ process in DL for half duplex frequency division duplex (HD-FDD) category (Cat) M1 UEs for LTE MTC. The 14-HARQ process may differ from a 10-HARQ process in that there may be a driver to ensure that the 14-HARQ process feature is relatively efficient in the presence of invalid subframes (e.g., subframes not specified for MTC usage).

These aspects of NR may increase the effective peak data rate compared to the 10-HARQ process configuration. For example, these aspects may increase the effective peak data of the 10-HARQ process configuration from 588 kilobits per second (kbps) (10×1000/17) to 706 kbps (24×1000/34) by introducing support for a 14-HARQ process. To accomplish these improvements, there may have to be additional MTC physical downlink control channel (MPDCCH) and PDSCH occasions added to the 10-HARQ process in order to boost the peak data rate. In addition, NR may have to specify the additional MPDCCH to PDSCH delays. For the 10-HARQ process feature, the delay between the MPDCCH and PDSCH (the number of subframes between MPDCCH to the corresponding PDSCH) may be fixed to 2. For the 4 additional HARQ processes, new delays may have to be specified to achieve the higher data rates in the presence of invalid subframes.

Furthermore, the additional PDSCH to HARQ-ACK delays may have to be specified in NR to accomplish the above described improvements for the 14-HARQ process. For both the 10-HARQ and 14-HARQ processes, HARQ-ACK bundling has to be supported, which may allow up to 4 HARQ-ACK responses to be processed by each one of the HARQ-ACK physical uplink control channels (PUCCHs). In addition, NR may have to specify how to signal the additional delays in downlink control information (DCI). DCI used to support the 10-HARQ process may have 3 specific fields. To support the above described improvements by the 14-HARQ process, there may have to be 1 bit for a HARQ-ACK bundling flag, 3 bits for a PDSCH-to-HARQ-ACK delay, and 4 bits for HARQ process numbering. The 10-HARQ process does not use an explicit DCI field for delay since the MPDCCH to PDSCH delay may be fixed to 2 for the 10-HARQ process. For 14-HARQ process, NR may provide support for 2 MPDCCH-PDSCH delays (2 and 7 subframes), and may provide descriptions of the type of subframes the 7 delay traverses. However, there may be a need for techniques related to the additional PDSCH to HARQ-ACK delays in 14-HARQ process and/or for signaling for the additional delays, such as in DCI. Certain embodiments described herein may provide solutions for these, or other, aspects.

Some embodiments described herein may provide for using relative transmission delay indexing. For example, with certain embodiments, a UE and a network node may determine valid uplink transmission occasions for control information and the network node may communicate an indication of a position of a valid uplink transmission occasion to the UE relative to other valid uplink transmission occasions for the control information. In this way, certain embodiments may provide a UE and a network node (e.g., a base station) with common information of where a PUCCH HARQ-ACK occasion is relative to other PUCCH HARQ-ACK occasions in time or order, without the need for regular and/or explicit signaling. This helps to conserve network resources (e.g., bandwidth) and computing resources of the UE and/or network node. Although certain embodiments are described herein in the context of uplink scenarios, certain embodiments may apply equally to downlink scenarios as well.

Figure 1:
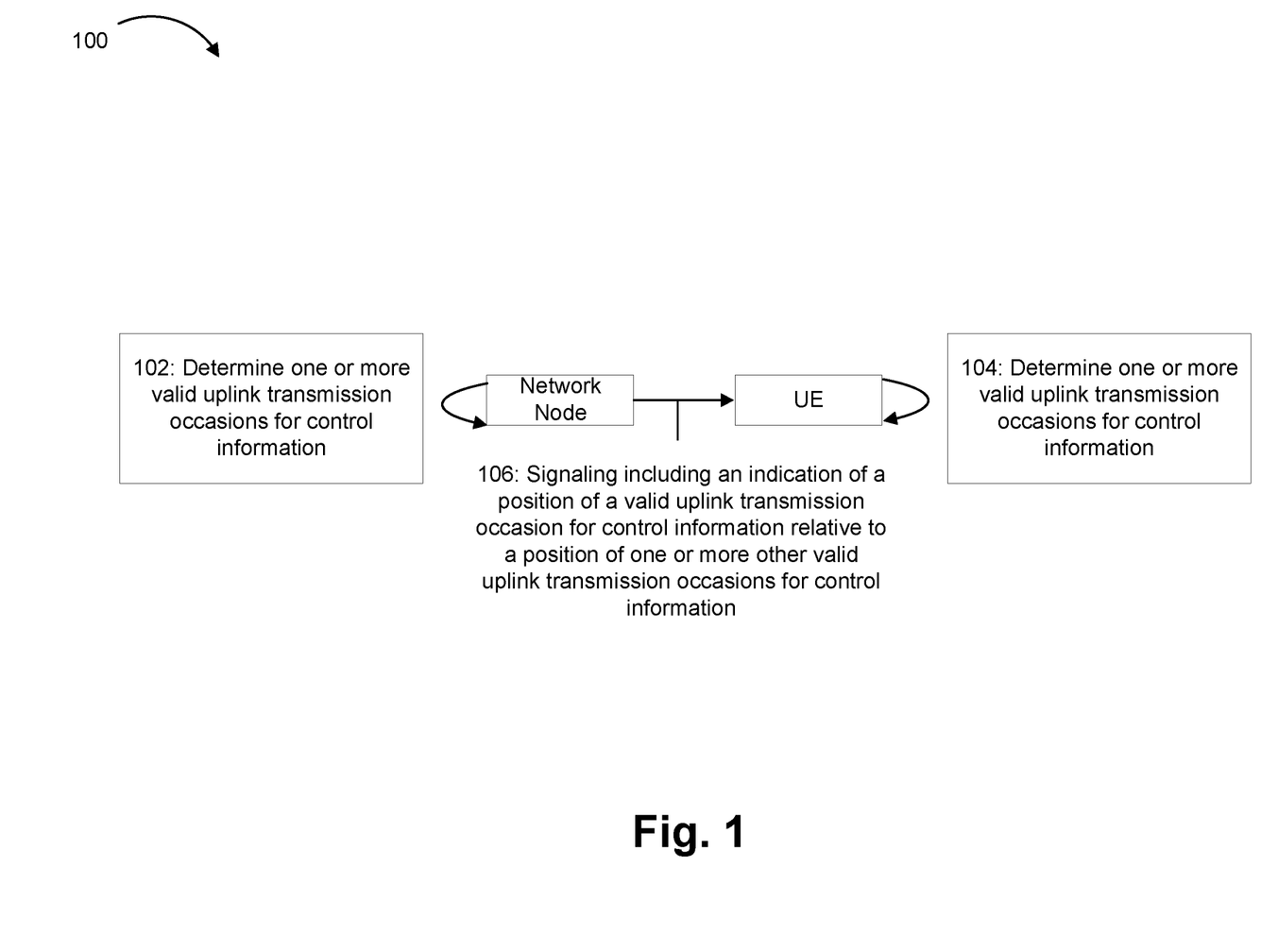
FIG. 1 illustrates an example of using relative uplink transmission occasion indexing, according to some embodiments.

FIG. 1 illustrates an example 100 of using relative uplink transmission occasion indexing, according to some embodiments. As illustrated in FIG. 1, the example 100 includes a network node (e.g., a base station) and a UE.

As illustrated at 102 and 104, the network node and/or the UE may determine one or more valid uplink transmission occasions for control information. For example, the network node and the UE may perform the determinations at 102 and 104 independently of each other. The one or more valid uplink transmission occasions for control information may include valid HARQ-ACK PUCCH occasions. In certain embodiments, the network node and/or the UE may determine valid PUCCH positions relative to a current subframe. For example, the valid subframes may be based on an invalid uplink (UL) bitmap, an invalid DL bitmap, a designated starting subframe, an MPDCCH to PDSCH delay, a HARQ process identifier, and/or one or more PUCCH positioning rules. As another example, the one or more valid uplink transmission occasions may be based on a predefined mapping of MPDCCH subframes to PDSCH occasions and corresponding PUCCH occasions. As another example, the network may determine a valid subframe bitmap for transmitting the PUCCH and may indicate this to the UE.

In some embodiments, the one or more PUCCH positioning rules may include a rule that a first MPDCCH in a cycle starts at a particular subframe (subframe X). The positioning of subframe X may be predefined and/or based on the invalid bitmap. Additionally, or alternatively, the positioning of subframe X may be configured by higher layers (e.g., a UE-specific radio resource control (RRC)-dedicated connection), and/or the like. The one or more PUCCH positioning rules may include a rule that, where there is no DL invalid subframe, the network node and the UE may determine that the next Y number of available valid DL subframes are to be used to schedule MPDCCH (e.g., where Y is 12, in some embodiments). In this way, certain embodiments may optimize degrees of scheduling freedom and efficient signaling, thereby improving operations of the network node and the UE. In some steady state scenarios, a network node may gain more HARQ-ACK scheduling options based on the relative indexing according to certain embodiments.

The one or more PUCCH positioning rules may include a rule where, for the first Z number of DL MPDCCH occasions, the network node and/or the UE may select a delay of N valid DL subframes before transmitting the corresponding PDSCH (e.g., where Z may equal 10 and N may equal 2, in some embodiments). The one or more PUCCH positioning rules may include a rule that, for the last M DL MPDCCH occasions in a sequence of L occasions, the network node and the UE may select a predefined delay of Q (e.g., where M may equal 2, L may equal 12 and Q may equal 7). This MPDCCH to PDSCH delay may be fixed (e.g., at 2 as for the 10-HARQ process), or may be signalled to the UE such as in DCI in connection with the operations at 106 below). The UE and/or the network node may apply the delay to transmission occasions.

The one or more PUCCH positioning rules may include a rule that, after P DL MPDCCH have been sent, the network node and/or the UE may use 1 subframe (of any type) to allow switching between DL and UL, and may then locate R PUCCHs in the next S valid UL subframes (e.g., where P may equal 12, R may equal 3, and S may equal 3, in some embodiments). Subframe positions for the first, second, and third subframes may be determined by both the UE and the network node. The one or more PUCCH positioning rules may include a rule that T subframes (of any type) are used to allow switching between DL and UL before transmitting the next MPDCCH for the next U DL MPDCCH occasions (e.g., where T may equal 1 and U may equal 10).

As illustrated at 106, the network node may transmit, and the UE may receive, signaling that includes an indication of a position of a valid uplink transmission occasion for control information relative to a position of one or more other valid uplink transmission occasions for control information. For example, the signaling may include an indication of whether the position of the valid uplink transmission occasion is a first, second, third, etc. valid uplink transmission occasion in a set of occasions (e.g., as illustrated in, and described with respect to, FIG. 2). Additionally, or alternatively, the indication may include an indication of which mapping of MPDCCH subframes to PDSCH occasions and corresponding PUCCH occasions the UE is to apply during the 14-HARQ initial configuration. The network node may signal, in connection with the signaling at 106, the MPDCCH to PDSCH delay described elsewhere herein.

As described above, FIG. 1 is provided as an example. Other examples are possible, according to some embodiments.

Figure 2:
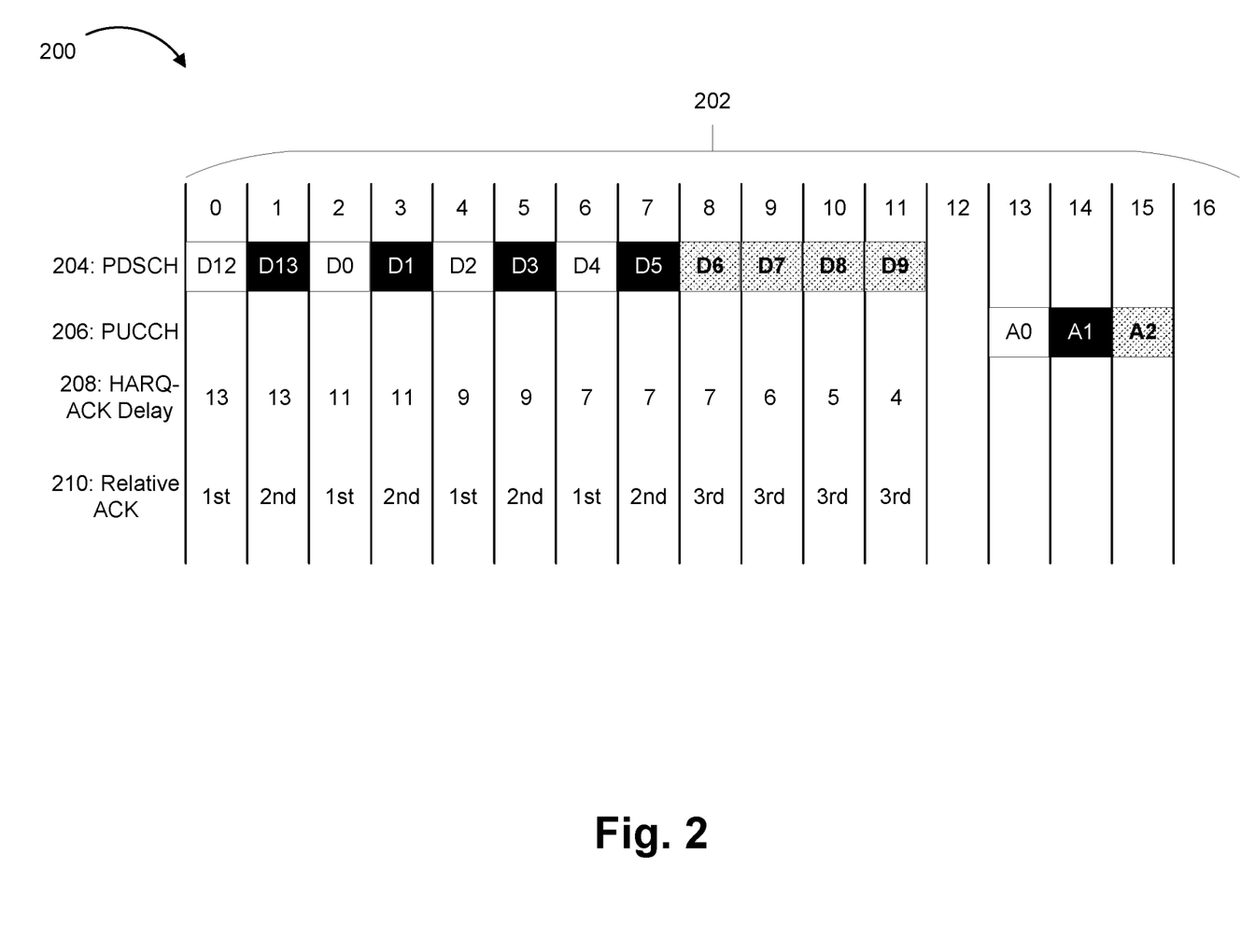
FIG. 2 illustrates an example of hybrid automatic repeat request (HARQ) acknowledgement (ACK) delay indexing, according to some embodiments.

FIG. 2 illustrates an example 200 of HARQ-ACK delay indexing, according to some embodiments. As illustrated in FIG. 2, the example 200 includes subframes illustrated at 202 (subframes with index values 0 through 16), PDSCH occasions illustrated at 204 (occasions with index values D0 through D9, D12, and D13), PUCCH occasions illustrated at 206 (occasions with index values A0, A1, and A2), HARQ-ACK delays illustrated at 208 (delay values of 12, 11, 9, 7, 6, 5, and 4), and relative ACK positions illustrated at 210 (1st position, 2nd position, and 3rd position).

The HARQ-ACK delays may indicate an amount of delay between PDSCH occasions and corresponding PUCCH occasions. For example, for the D12 PDSCH occasion in subframe 0, A0 may be the corresponding PUCCH occasion in subframe 13. The delay between subframe 0 and subframe 13 is 13 subframes, resulting in a HARQ-ACK delay value of 13 for the D12 PDSCH occasion. The relative ACK positions may identify the position of the PUCCH occasion to use for a PDSCH occasion relative to one or more other PUCCH occasions. For example, as explained above, A0 is the PUCCH occasion corresponding to the D12 PDSCH occasion, and A0 is the 1st PUCCH occasion in time or order of the set of PUCCH occasions that includes A0, A1, and A2. In other words, A0 is the 1st PUCCH occasion relative to occasions A1 and A2, whereas A1 is the 2nd occasion, and A2 is the 3rd occasion. In connection with the operations at 106 of FIG. 1, the network node may transmit an indication of the relative ACK positions that are illustrated at 210. For example, for PDSCH occasion D12, the network node may transmit an indication that the PUCCH occasion corresponding to the PDSCH occasion D12 is the 1st PUCCH occasion A0.

In this way, certain embodiments may reduce signaling, e.g., in DCI, for indicating ACK occasion positioning. For example, rather than indicating the HARQ-ACK delay, the network node may transmit an indication of the relative position of the PUCCH occasion corresponding to a PDSCH occasion. For this and other scenarios, not being restricted to a finite set of HARQ-ACK delays may provide the network node more options for scheduling the ACK for a PDSCH in a given subframe, e.g., D12, D13, D0, and D1, may be scheduled to the 1st HARQ-ACK occasion, which would otherwise need 2 additional absolute delays (12 and 10) to be supported if an absolute subframe gap definition was being used.

As indicated above, FIG. 2 is provided as an example. Other examples are possible, according to some embodiments.

Figure 3:
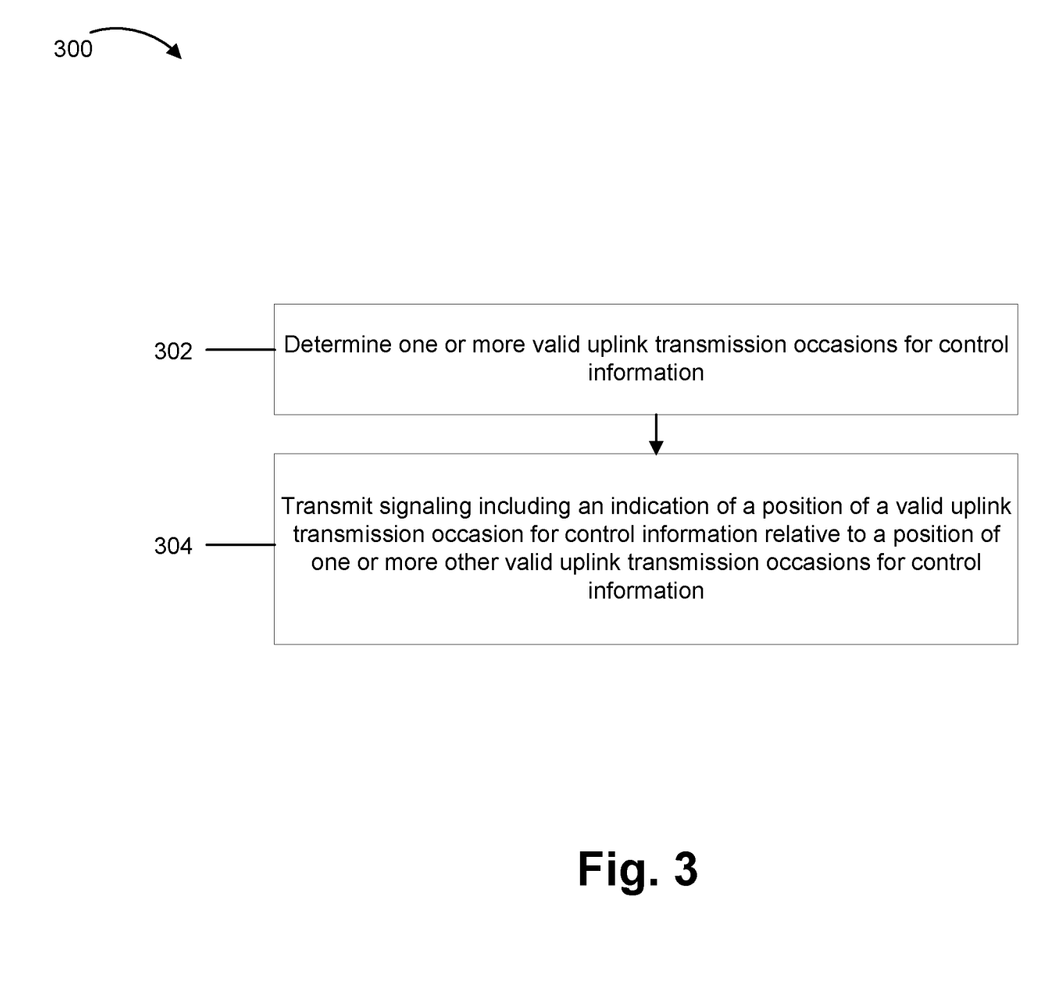
FIG. 3 illustrates an example flow diagram of a method, according to some embodiments.

FIG. 3 illustrates an example flow diagram of a method 300, according to some embodiments. For example, FIG. 3 may illustrate example operations of a network node (e.g., apparatus 10 illustrated in, and described with respect to, FIG. 5a). Some of the operations illustrated in FIG. 3 may be similar to some operations shown in, and described with respect to, FIGS. 1 and 2.

In an embodiment, the method 300 may include, at 302, determining one or more valid uplink transmission occasions for control information, e.g., in a manner similar to that at 102 of FIG. 1. The method 300 may include, at 304, transmitting signaling including an indication of a position of a valid uplink transmission occasion for control information relative to a position of one or more other valid uplink transmission occasions for control information, e.g., in a manner similar to that at 106 of FIG. 1.

The method 300 illustrated in FIG. 3 may include one or more additional aspects described below or elsewhere herein. In some embodiments, the one or more valid uplink transmission occasions for control information may include one or more valid hybrid automatic repeat request acknowledgement physical uplink control channel transmission occasions. In some embodiments, the method 300 may include transmitting signaling comprising an indication of the one or more valid hybrid automatic repeat request acknowledgement physical uplink control channel transmission occasions. In some embodiments, the determining at 302 may include determining the one or more valid uplink transmission occasions based on one or more of: an invalid uplink bitmap, an invalid downlink bitmap, a designated starting subframe, a machine type communication physical downlink control channel to physical downlink shared channel delay, a hybrid automatic repeat request identifier, or one or more physical uplink control channel positioning rules.

In some embodiments, the one or more physical uplink control channel positioning rules may include a rule that a first machine type communication physical downlink control channel occasion in a cycle starts at a particular subframe. In some embodiments, the one or more physical uplink control channel positioning rules may include a rule that, where there is no downlink invalid subframe, a next number of available valid downlink subframes are used to schedule a machine type communication physical downlink control channel transmission. In some embodiments, the one or more physical uplink control channel positioning rules may include a rule that, for a first number of machine type communication physical downlink control channel occasions, there is a delay of a number of valid downlink subframes before transmission of a corresponding physical downlink shared channel.

In some embodiments, the one or more physical uplink control channel positioning rules may include a rule that a predefined delay is used for a last number of machine type communication physical downlink control channel occasions in a sequence of occasions. In some embodiments, the one or more physical uplink control channel positioning rules may include a rule that, after a number of machine type communication physical downlink control channel transmissions, a number of subframes are used to allow switching between downlink and uplink. In some embodiments, the determining at 302 may include determining the one or more valid uplink transmission occasions based on a mapping of machine type communication physical downlink control channel occasions to physical downlink shared channel occasions and corresponding physical uplink control channel occasions.

As described above, FIG. 3 is provided as an example. Other examples are possible according to some embodiments.

Figure 4:
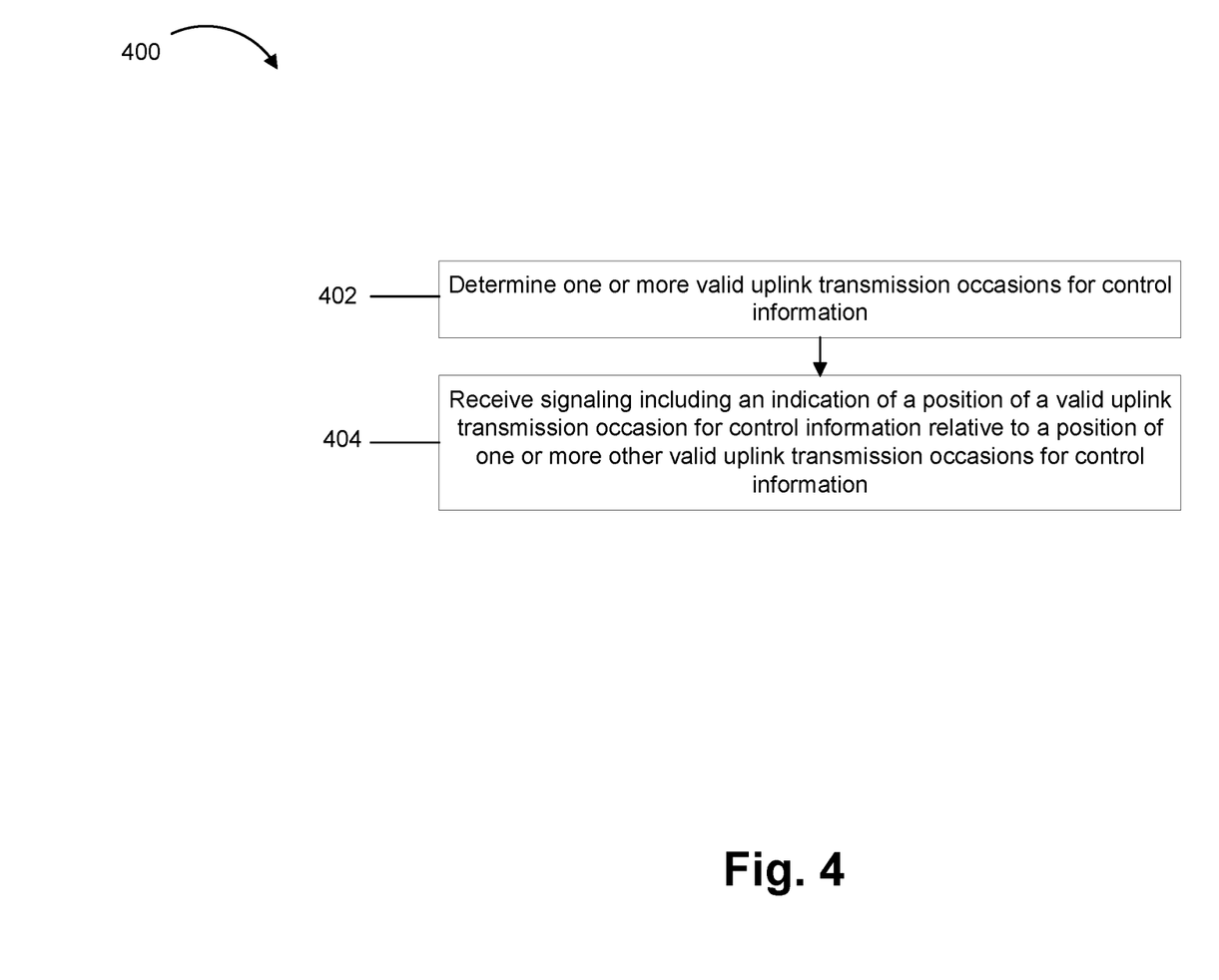
FIG. 4 illustrates an example flow diagram of a method, according to some embodiments.

FIG. 4 illustrates an example flow diagram of a method 400, according to some embodiments. For example, FIG. 4 may illustrate example operations of a UE (e.g., apparatus 20 illustrated in, and described with respect to, FIG. 5b). Some of the operations illustrated in FIG. 4 may be similar to some operations shown in, and described with respect to, FIGS. 1 and 2.

In an embodiment, the method 400 may include, at 402, determining one or more valid uplink transmission occasions for control information, e.g., in a manner similar to that at 104 of FIG. 1. In some embodiments, the method 400 may include, at 404, receiving signaling including an indication of a position of a valid uplink transmission occasion for control information relative to positions of one or more other valid uplink transmission occasions for control information, e.g., in a manner similar to that at 106 of FIG. 1.

The method 400 illustrated in FIG. 4 may include one or more additional aspects described below or elsewhere herein. In some embodiments, the one or more valid uplink transmission occasions for control information may include one or more valid hybrid automatic repeat request acknowledgement physical uplink control channel transmission occasions. In some embodiments, the method 400 may include receiving signaling including an indication of the one or more valid hybrid automatic repeat request acknowledgement physical uplink control channel transmission occasions. In some embodiments, the determining at 402 may include determining the one or more valid uplink transmission occasions based on the signaling comprising the indication of one or more valid hybrid automatic repeat request acknowledgement physical uplink control channel transmission occasions. In some embodiments, the determining at 402 may include determining the one or more valid uplink transmission occasions based on one or more of: an invalid uplink bitmap, an invalid downlink bitmap, a designated starting subframe, a machine type communication physical downlink control channel to physical downlink shared channel delay, a hybrid automatic repeat request identifier, or one or more physical uplink control channel positioning rules.

In some embodiments, the one or more physical uplink control channel positioning rules may include a rule that a first machine type communication physical downlink control channel occasion in a cycle starts at a particular subframe. In some embodiments, the one or more physical uplink control channel positioning rules may include a rule that, where there is no downlink invalid subframe, a next number of available valid downlink subframes are used to schedule a machine type communication physical downlink control channel transmission. In some embodiments, the one or more physical uplink control channel positioning rules may include a rule that, for a first number of machine type communication physical downlink control channel occasions, there is a delay of a number of valid downlink subframes before transmission of a corresponding physical downlink shared channel.

In some embodiments, the UE can implicitly determine a sequence of subframe types that a specific HARQ-ACK delay applies to, if the UE: (1) has (or can access) information regarding the invalid subframe bitmap, (2) determines (e.g., assumes) that 12 HARQ processes are sent before, e.g., 3 bundled ACKs are sent, (3) determines how many HARQ processes have been sent since the last set of ACKs were completed, and (4) allows for a, e.g., 1 subframe (of any type) transition between UL and DL transmissions. In this case, the HARQ-ACK PUCCH location may be determined by the UE using implicit information of where the PUCCHs may appear and a 2-bit parameter in the DCI, y, indicating the relative delay, according to the following: if y=0, the PUCCH may be transmitted in (11-i) bandwidth reduced low complexity (BL)/coverage enhancement (CE) DL subframe+1 subframe (any type)+(y+1) BL/CE UL subframes after the DCI is sent. If y>0, the PUCCH may be transmitted in (11-i) BL/CE DL subframe+1 subframe (any type)+(y) BL/CE UL subframes after the DCI is sent. The variable i may equal $\{0, 1, 2, \ldots, 11\}$ number of HARQ processes transmitted in a cycle since the last set of, e.g., 3 ACKs were sent. The variable y may equal $\{0, 1, 2, 3\}$ where 0 and 1 may indicate, e.g., that the 1st available PUCCH is to be used, 2 may indicate, e.g., the 2nd available PUCCH, and 3 may indicate, e.g., the 3rd available PUCCH. When y=0, it may also indicate to the UE that the UE's counting of the internal variable i may have to start (e.g., 0). BL may refer to "bandwidth limited" in some contexts.

In some embodiments, the one or more physical uplink control channel positioning rules may include a rule that a predefined delay is used for a last number of machine type communication physical downlink control channel occasions in a sequence of occasions. In some embodiments, the one or more physical uplink control channel positioning rules may include a rule that, after a number of machine type communication physical downlink control channel transmissions, a number of subframes are used to allow switching between downlink and uplink. In some embodiments, the determining at 402 may include determining the one or more valid uplink transmission occasions based on a mapping of machine type communication physical downlink control channel occasions to physical downlink shared channel occasions and corresponding physical uplink control channel occasions. In some embodiments, the method 400 may further include transmitting the control information on the one or more valid uplink transmission occasions.

As described above, FIG. 4 is provided as an example. Other examples are possible according to some embodiments.

Figure 5A:
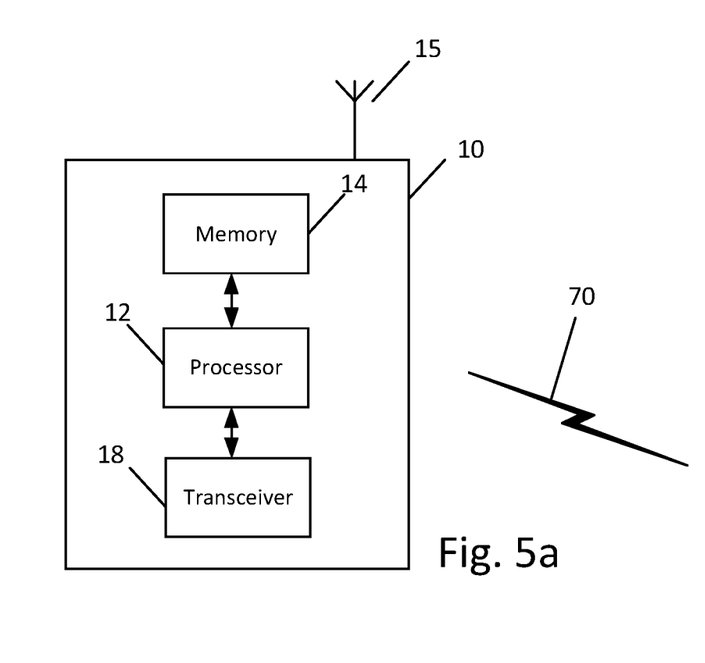
FIG. 5a illustrates an example block diagram of an apparatus, according to an embodiment.

FIG. 5a illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), and/or a WLAN access point, associated with a radio access network, such as a LTE network, 5G or NR. In some example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5a.

As illustrated in the example of FIG. 5a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna (s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like.

According to certain embodiments, apparatus 10 may be controlled by memory 14 and processor 12 to perform the functions associated with any of the embodiments described herein, such as some operations illustrated in, or described with respect to, FIGS. 1-3. For instance, apparatus 10 may be controlled by memory 14 and processor 12 to perform the method of FIG. 3.

Figure 5B:
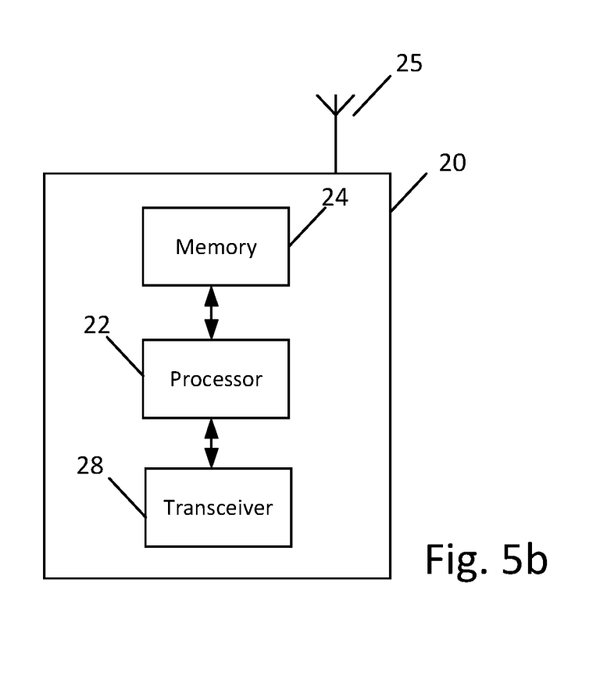
FIG. 5b illustrates an example block diagram of an apparatus, according to another embodiment.

FIG. 5b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5b.

As illustrated in the example of FIG. 5b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry. As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with any of the embodiments described herein, such as some operations illustrated in, or described with respect to, FIGS. 1-2 and 4. For instance, in one embodiment, apparatus 20 may be controlled by memory 24 and processor 22 to perform the method of FIG. 4.

In some embodiments, an apparatus (e.g., apparatus 10 and/or apparatus 20) may include means for performing a method or any of the variants discussed herein, e.g., a method described with reference to FIGS. 3 and 4. Examples of the means may include one or more processors, memory, and/or computer program code for causing the performance of the operation.

Therefore, certain example embodiments provide several technological improvements, enhancements, and/or advantages over existing technological processes. For example, one benefit of some example embodiments is a reduction in the amount of signaling needed to indicate transmission occasion positioning or delay, which conserves network resources and/or computing resources of a network node and/or a UE. Accordingly, the use of some example embodiments results in improved functioning of communications networks and their nodes and, therefore constitute an improvement at least to the technological field of uplink transmission occasion indication for control information, among others.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations used for implementing functionality of an example embodiment may be performed as routine(s), which may be implemented as added or updated software routine(s). In one example, software routine(s) may be downloaded into the apparatus.

As an example, software or a computer program code or portions of code may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein apply equally to both singular and plural implementations, regardless of whether singular or plural wording is used in connection with describing certain embodiments. For example, an embodiment that describes operations of a single network node equally applies to embodiments that include multiple instances of the network node, and vice versa.

One having ordinary skill in the art will readily understand that the example embodiments as discussed above may be practiced with operations in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

PARTIAL GLOSSARY

3GPP 3rd generation project partner
LTE Long term evolution
MTC Machine type communication
NB-IoT Narrow Band-Internet of Things
CE Coverage enhanced
eNB enhanced Node-B
UE User equipment
DL Downlink
UL Uplink
RRC Radio resource control
PRB Physical resource block
PDSCH Physical downlink sharing channel
NPDSCH Narrow band PDSCH
DCI Downlink control information
PDCCH Physical downlink control channel
NPDCCH Narrow band PDCCH
LSB Least significant bit
MSB Most significant bit
MAC Medium Access Control
CE Control Element

We claim:

1. An apparatus, comprising:
at least one processor; and
at least one memory including computer program code,
wherein the at least one memory and the computer program code are configured to, with the at least one processor, cause the apparatus at least to:
determine one or more valid uplink transmission occasions for control information based on a mapping of machine type communication physical downlink control channel occasions to physical downlink shared channel occasions and corresponding physical uplink control channel occasions that a user equipment is to apply during a hybrid automatic repeat request initial configuration; and
transmit signaling comprising an indication of a position of a valid uplink transmission occasion for control information relative to a position of one or more other valid uplink transmission occasions for control information.

2. The apparatus according to claim 1, wherein the one or more valid uplink transmission occasions for control information comprise one or more valid hybrid automatic repeat request acknowledgement physical uplink control channel transmission occasions; and
wherein the at least one memory and the computer program code are configured to, with the at least one processor, further cause the apparatus at least to:

transmit signaling comprising an indication of the one or more valid hybrid automatic repeat request acknowledgement physical uplink control channel transmission occasions.

3. The apparatus according to claim 1, wherein the at least one memory and the computer program code are configured to, with the at least one processor, further cause the apparatus, when determining the one or more valid uplink transmission occasions for control information, at least to:
determine the one or more valid uplink transmission occasions based on one or more of:
an invalid uplink bitmap,
an invalid downlink bitmap,
a designated starting subframe,
a machine type communication physical downlink control channel to physical downlink shared channel delay,
a hybrid automatic repeat request identifier, or
one or more physical uplink control channel positioning rules.

4. The apparatus according to claim 3, wherein the one or more physical uplink control channel positioning rules comprise a rule that a first machine type communication physical downlink control channel occasion in a cycle starts at a particular subframe.

5. The apparatus according to claim 3, wherein the one or more physical uplink control channel positioning rules comprise a rule that, where there is no downlink invalid subframe, a next number of available valid downlink subframes are used to schedule a machine type communication physical downlink control channel transmission.

6. The apparatus according to claim 3, wherein the one or more physical uplink control channel positioning rules comprise a rule that, for a first number of machine type communication physical downlink control channel occasions, there is a delay of a number of valid downlink subframes before transmission of a corresponding physical downlink shared channel.

7. The apparatus according to claim 3, wherein the one or more physical uplink control channel positioning rules comprise a rule that a predefined delay is used for a last number of machine type communication physical downlink control channel occasions in a sequence of occasions.

8. The apparatus according to claim 3, wherein the one or more physical uplink control channel positioning rules comprise a rule that, after a number of machine type communication physical downlink control channel transmissions, a number of subframes are used to allow switching between downlink and uplink.

9. An apparatus, comprising:
at least one processor; and
at least one memory including computer program code,
wherein the at least one memory and the computer program code are configured to, with the at least one processor, cause the apparatus at least to:
determine one or more valid uplink transmission occasions for control information based on a mapping of machine type communication physical downlink control channel occasions to physical downlink shared channel occasions and corresponding physical uplink control channel occasions that the apparatus is to apply during a hybrid automatic repeat request initial configuration; and
receive signaling comprising an indication of a position of a valid uplink transmission occasion for control information relative to a position of one or more other valid uplink transmission occasions for control information.

10. The apparatus according to claim 9, wherein the one or more valid uplink transmission occasions for control information comprise one or more valid hybrid automatic repeat request acknowledgement physical uplink control channel transmission occasions; and
wherein the at least one memory and the computer program code are configured to, with the at least one processor, further cause the apparatus at least to:
receive signaling comprising an indication of the one or more valid hybrid automatic repeat request acknowledgement physical uplink control channel transmission occasions.

11. The apparatus according to claim 9, wherein the at least one memory and the computer program code are configured to, with the at least one processor, further cause the apparatus, when determining the one or more valid uplink transmission occasions for control information, at least to:
determine the one or more valid uplink transmission occasions based on one or more of:
an invalid uplink bitmap,
an invalid downlink bitmap,
a designated starting subframe,
a machine type communication physical downlink control channel to physical downlink shared channel delay,
a hybrid automatic repeat request identifier, or
one or more physical uplink control channel positioning rules.

12. The apparatus according to claim 11, wherein the one or more physical uplink control channel positioning rules comprise a rule that a first machine type communication physical downlink control channel occasion in a cycle starts at a particular subframe.

13. The apparatus according to claim 11, wherein the one or more physical uplink control channel positioning rules comprise a rule that, where there is no downlink invalid subframe, a next number of available valid downlink subframes are used to schedule a machine type communication physical downlink control channel transmission.

14. The apparatus according to claim 11, wherein the one or more physical uplink control channel positioning rules comprise a rule that, for a first number of machine type communication physical downlink control channel occasions, there is a delay of a number of valid downlink subframes before transmission of a corresponding physical downlink shared channel.

15. The apparatus according to claim 11, wherein the one or more physical uplink control channel positioning rules comprise a rule that a predefined delay is used for a last number of machine type communication physical downlink control channel occasions in a sequence of occasions.

16. The apparatus according to claim 11, wherein the one or more physical uplink control channel positioning rules comprise a rule that, after a number of machine type communication physical downlink control channel transmissions, a number of subframes are used to allow switching between downlink and uplink.

17. The apparatus according to claim 9, wherein the at least one memory and the computer program code are configured to, with the at least one processor, further cause the apparatus at least to:
transmit the control information on the one or more valid uplink transmission occasions.

18. A method, comprising:
determining one or more valid uplink transmission occasions for control information; and transmitting signaling comprising an indication of a position of a valid uplink transmission occasion for control information relative to a position of one or more other valid uplink transmission occasions for control information based on a mapping of machine type communication physical downlink control channel occasions to physical downlink shared channel occasions and corresponding physical uplink control channel occasions that a user equipment is to apply during a hybrid automatic repeat request initial configuration.

* * * * *